United States Patent
Hoshino

(10) Patent No.: US 7,143,425 B2
(45) Date of Patent: Nov. 28, 2006

(54) DISC DRIVE APPARATUS

(75) Inventor: Toru Hoshino, Gunma-Ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 385 days.

(21) Appl. No.: 10/880,597

(22) Filed: Jul. 1, 2004

(65) Prior Publication Data
US 2005/0022218 A1 Jan. 27, 2005

(30) Foreign Application Priority Data
Jul. 25, 2003 (JP) ............................. 2003-280461

(51) Int. Cl.
*G11B 7/085* (2006.01)
(52) U.S. Cl. .................................... 720/664
(58) Field of Classification Search ........ 720/664–665, 720/661, 607, 674–675; 369/219.1, 215.1, 369/244.1
See application file for complete search history.

(56) References Cited

FOREIGN PATENT DOCUMENTS
JP 2001-325775 11/2001

*Primary Examiner*—Hoa Thi Nguyen
*Assistant Examiner*—Mark Blouin
(74) *Attorney, Agent, or Firm*—Connolly Bove Lodge & Hutz LLP

(57) ABSTRACT

A disc drive apparatus is composed of a disc carrying mechanism, a turntable (1), a pickup unit (2), a pickup transport mechanism, a reversible motor (7), a first transmission system (8A), a second transmission system (8B), and a transmission route changing mechanism. The pickup transport mechanism is further composed of a screw shaft (5) and a driven body (6) linking to the screw shaft (5) and the pickup unit (2). The driven body (6) moves reciprocally and linearly in a transport direction of the pickup unit (2) by reversible rotation of the reversible motor (7), and moves with being accompanied by the pickup unit (2) within a movable range (L) of the pickup unit (2), and moves independently out of the movable range (L). The transmission route changing mechanism conducts to change the transmission route linked to the reversible motor (7) from the first transmission system (8A) over to the second transmission system (8B) when the driven body (6) is moved independently out of the movable range (L) while the pickup unit (2) is stopped at one end of the movable range (L).

6 Claims, 10 Drawing Sheets

DISC DRIVE APPARATUS

BACKGROUND OF THE INVENTION

1. Field of the Invention

The present invention relates to a disc drive apparatus that is utilized for recording information such as music in a disc and reproducing recorded information, particularly, relates to a disc drive apparatus that is suitable for recording and reproducing a magneto-optical disc contained in a predetermined cartridge such as a mini-disc (MD).

2. Description of the Related Art

A disc such as MD (mini-disc), CD (compact disc) and DVD (digital versatile disc or digital video disc) has been well known as a recording medium for musical information until now. An apparatus for reproducing recorded information has been composed of a turntable for rotating a disc loaded thereon, a pickup unit for reading out recorded information in the disc that rotates, a transportation mechanism for transporting the pickup unit in a radial direction of the disc, and a mechanism for loading or unloading the disc. In the case of an apparatus that accommodates a recordable discs, the apparatus is provided with a magnetic head. Particularly, such a disc drive apparatus accommodating a recordable disc is provided with a plurality of motors as a driving source for rotating and carrying a disc, for transporting a pickup, and for elevating a magnetic head. However, increasing a number of motors makes an apparatus larger in size and results in increasing a manufacturing cost.

Consequently, it has been practiced that one motor was used commonly for carrying a disc and transporting a pickup or for carrying a disc and elevating a magnetic head.

In a case of a disc drive apparatus utilizing a motor common to carrying a disc and transporting a pickup, for example, the Japanese Patent Application Laid-open Publication No. 2001-325775 discloses that unloading a disc is conducted by changing a motor power transmission route from a transporting system for a pickup over to a carrying system for a disc by means of moving a pickup unit to either an inner circumferential side or an outer circumferential side of the disc.

On the contrary, the motor power transmission route of the apparatus disclosed in the Patent Application Laid-open Publication No. 2001-325775 is essential to be changed over to the carrying system for a disc only when the pickup unit is transported to the outside of an information recording area of the disc so as not to have been changed over to the carrying system for the disc while reproducing the disc. In this connection, a range of movement of the pickup is essential to be set wider, and resulting in a problem such that the apparatus is made larger in size.

Particularly, in a case of a disc contained in a cartridge such as an MD disc, a part of the cartridge is opened so as to expose an information recording area of the MD disc. An objective lens of a pickup unit is made to approach the disc within an opened section of the cartridge. Consequently, the pickup unit disables to be transported because the pickup unit interferes with the cartridge although the pickup unit is attempted to be transported to the outside of the information recording area of the disc in order to change a motor power transmission route over to the carrying system for the disc.

Accordingly, in a case of a disc that is not contained in a cartridge such as a CD disc, a pickup unit enables to be used as a trigger for changing a motor power transmission route. However, the pickup unit disables to be applied for a disc contained in a cartridge as a trigger. A conventional disc drive apparatus that accommodates a disc contained in a cartridge has been equipped with a plurality of motors for rotating a disc, transporting a pickup unit and carrying the disc individually, so that the apparatus was hardly decreased in size or reduced in cost.

On the other hand, providing a motor exclusively for elevating a magnetic head as a driving source makes the apparatus to be decreased in size or reduced in cost harder. Consequently, it is strongly required for such an exclusive motor to be shared with other driving source.

SUMMARY OF THE INVENTION

Accordingly, in consideration of the above-mentioned problems of the prior art, an object of the present invention is to provide a disc drive apparatus that enables to transport a pickup unit and to carry a disc, even a disc contained in a cartridge such as a MD disc, by means of a common motor.

Further, another object of the present invention is to provide a disc drive apparatus, which enables to elevate a magnetic head without using a motor exclusively for the magnetic head to elevate.

In order to achieve the above object, the present invention provides, according to an aspect thereof, a disc drive apparatus comprising: a disc carrying means for loading and unloading a disc; a turntable to be loaded with a disc carried in by the disc carrying means; a pickup unit to read out information recorded in the disc; a pickup transport means for transporting the pickup unit in a radial direction of the disc loaded on the turntable; a driving source; a first transmission system to transmit power of the driving source to the pickup transport means; a second transmission system to transmit the power of the driving source to the disc carrying means; and a transmission route changing means for changing a transmission route linking to the driving source from either one of the first and second transmission systems over to another transmission system, the pickup transport means further comprising: a motive body enabling to rotate reversibly by means of power transmitted through the first transmission system; and a driven body linking to the motive body and the pickup unit, wherein the driven body moves reciprocally and linearly in a transport direction of the pickup unit by means of reversible rotation of the motive body, and moves with being accompanied by the pickup unit within a movable range of the pickup unit and moves independently out of the movable range of the pickup unit, and wherein the transmission route changing means conducts to change the transmission route linked to the driving source from the first transmission system over to the second transmission system when the driven body is moved independently out of the movable range of the pickup unit while the pickup unit is stopped at one end of the movable range of the pickup unit.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
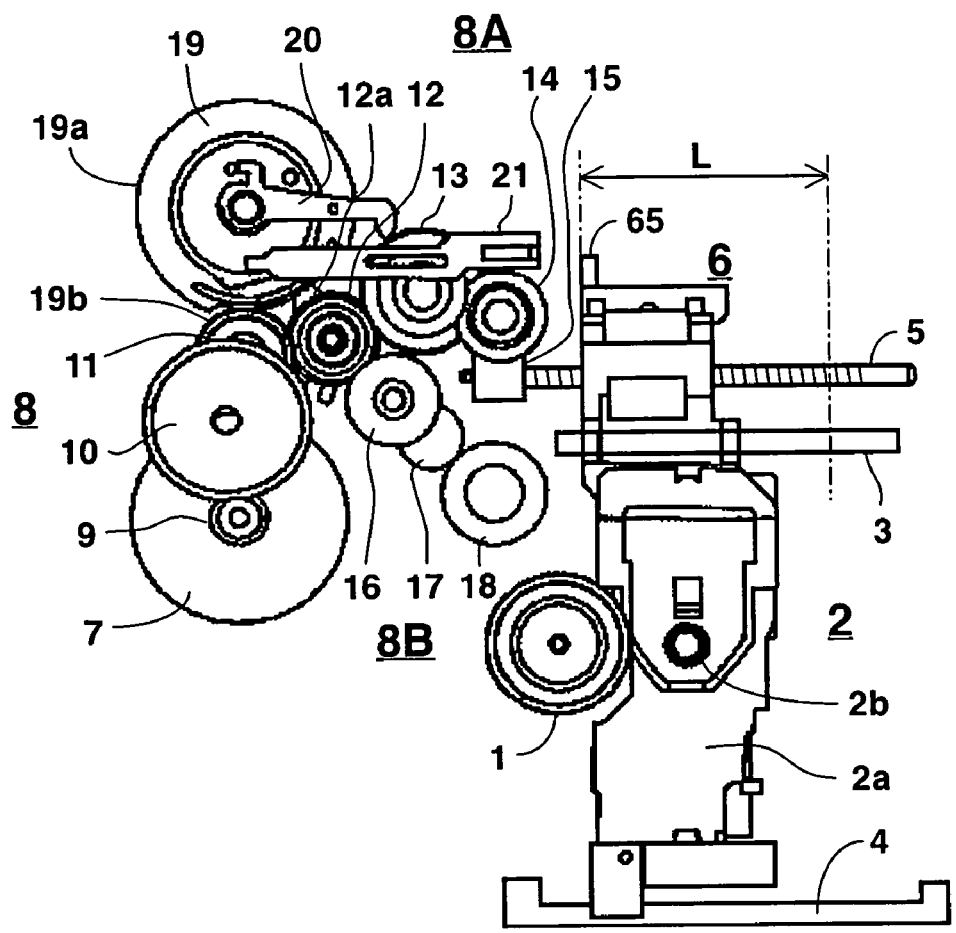
FIG. 1 is a plan view of a disc drive apparatus according to a first embodiment of the present invention.
Figure 2A:
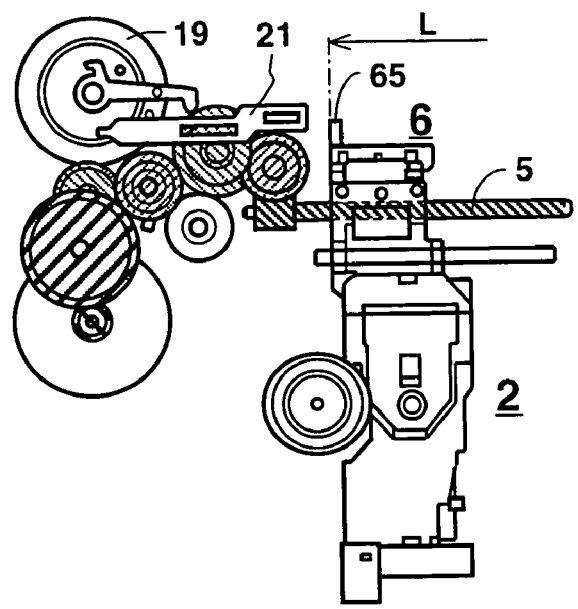
FIGS. 2(a) to 2(d) are plan views of the disc drive apparatus shown in FIG. 1 exhibiting a process of changing a motor power transmission route from a first transmission system over to a second transmission system.
Figure 2B:
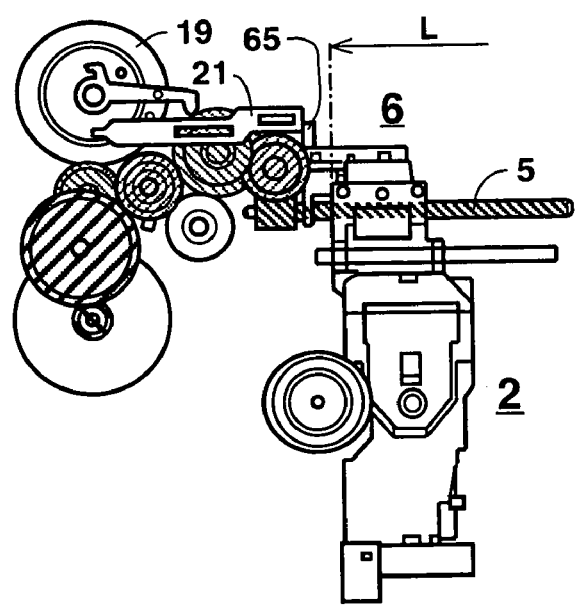
Figure 2C:
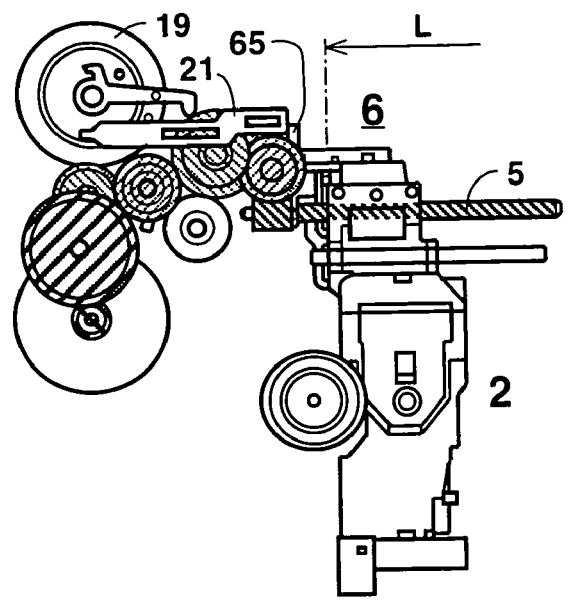
Figure 2D:
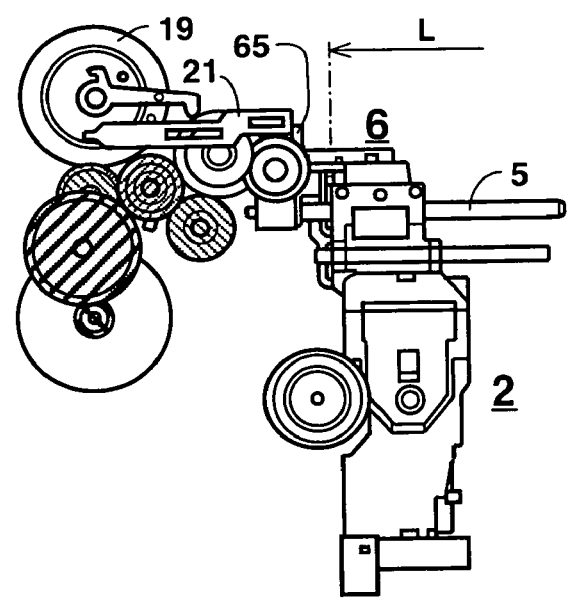

FIG. 1 is a plan view of a disc drive apparatus according to a first embodiment of the present invention.

FIGS. 2(a) to 2(d) are plan views of the disc drive apparatus shown in FIG. 1 exhibiting a process of changing a motor power transmission route from a first transmission system over to a second transmission system.

In FIG. 1, a disc drive apparatus is composed of a turntable 1, a pickup unit 2, a guide shaft 3, a guide rail 4, a motive body 5 (hereinafter referred to as a screw shaft 5), a driven body 6, a driving source 7 (hereinafter referred to as a reversible motor 7), a gear transmission system 8, a first gear 9, a second gear 10, a third gear 11, a change gear 12, a fourth gear 13, a fifth gear 14, a worm 15, a sixth gear 16, a seventh gear 17, a eighth gear 18, a cam wheel 19, a seesaw arm 20, a slide arm 21, and a projection 65. The pickup unit 2 is utilized for reading recorded information in a disc loaded on the turntable 1 and further composed of a carriage 2a, which is equipped with an optical component such as an objective lens 2b and a photo diode (not shown). Particularly, the pickup unit 2 enables to move within a range from an initial position in an inner circumferential area of a disc to a terminal position in an outer circumferential area of the disc in the radial direction of the disc while both ends of the carriage 2a move along the guide shaft 3 and the guide rail 4 respectively, wherein a reference sign L denotes a movable range of the pickup unit 2.

Further, at the initial position of the pickup unit 2, the objective lens 2b enables to read out TOC (Table Of Contents) information recorded in a lead-in area of a disc.

Furthermore, the terminal position of the pickup unit 2 corresponds to an outermost circumference of an information recording area of the disc.

More, the pickup unit 2 enables to reproduce recorded information in a disc through reflected light from the disc by irradiating a laser beam on a pit array of the disc while the pickup unit 2 is transported in the radial direction of the disc by a pickup transport mechanism to be explained.

Moreover, the pickup transport mechanism is composed of the screw shaft 5 that is provided rotatable freely and in parallel to a transport direction of the pickup unit 2 and the driven body 6 that is engaged with the screw shaft 5. The driven body 6 is lain between the screw shaft 5 and the pickup unit 2, and moves linearly and reciprocally in the longitudinal direction of the screw shaft 5 or the transport direction of the pickup unit 2 in accordance with reversible rotation of the screw shaft 5, and is engaged with the pickup unit 2 with enabling to move relatively with respect to the transport direction of the pickup unit 2. It should be understood that the screw shaft 5 and the driven body 6 being engaged with the screw shaft 5 is replaced with a pinion and a longer rack respectively.

The reversible motor 7 makes the pickup transport mechanism drive as a driving source and is also shared as a driving source for a disc carrying mechanism not shown. The gear transmission system 8 transmits power of the reversible motor 7 to the pickup transport mechanism and the disc carrying mechanism alternately. In this connection, the gear transmission system 8 is composed of two systems: a first transmission system 8A linked to the pickup transport mechanism and a second transmission system 8B linked to the disc carrying mechanism. The first transmission system 8A is composed of the first gear 9 mounted on a driving shaft of the reversible motor 7, the second gear 10 engaging with the gear 9, the third gear 11 engaging with a smaller diameter section of the second gear 10, the change gear 12 engaging with the third gear 11, the fourth gear 13 engaging with the change gear 12, the fifth gear 14 engaging with a smaller diameter section of the fourth gear 13, and the worm 15 engaging with the fifth gear 14. The worm 15 is fixed to one end section of the screw shaft 5 and transmits rotational driving force of the reversible motor 7 to the screw shaft 5.

On the other hand, the second transmission system 8B is composed of the first to third gears 9 to 11 and the change gear 12, the sixth gear 16 engaging with the change gear 12, the seventh gear 17 engaging with a smaller diameter section of the sixth gear 16, and the eighth gear 18 engaging with the seventh gear 17. The rotational driving force of the reversible motor 7 is transmitted to the disc carrying mechanism through the eighth gear 18.

The fourth and sixth gears 13 and 16 constituting the first and second transmission systems 8A and 8B respectively are disposed in different levels from each other.

Further, the change gear 12, which is common to the first and second transmission systems 8A and 8B, is disposed at a diverging point of both the first and second transmission systems 8A and 8B so as to be movable vertically as much as a level difference between the fourth and sixth gears 13 and 16 in order to engage with either the fourth gear 13 or the sixth gear 16. The cam wheel 19 is utilized for elevating the change gear 12, and formed with a cam section not shown on a bottom end. Making a depending member 12a, which extends out from the change gear 12 and moves dependently on the cam wheel 19, contact with the cam section not shown constitutes a transmission route changing mechanism that changes from the first transmission system 8A over to the second transmission system 8B, and vice versa.

The cam wheel 19 is formed with a gear section 19a engaging with the third gear 11 in an outer circumference area of the cam wheel 19. A part of cogs of the gear section 19a is removed so as to be a non-cogged section 19b. While transmitting power of the reversible motor 7 to either the pickup transport mechanism or the disc carrying mechanism, the non-cogged section 19b confronts with the third gear 11 in order for the cam wheel 19 not to be rotated.

Further, the seesaw arm 20 and the slide arm 21 is mounted on a cover not shown that is provided above the cam wheel 19 so as to cover the gear transmission system 8 totally. When these seesaw and slide arms 20 and 21 push a specific area of the cam wheel 19, the gear section 19a of the cam wheel 19 is rotated as far as a position to be engaged with the third gear 11. Then the cam wheel 19 is rotated by the third gear 11 when the gear section 19a is engaged with the third gear 11. Consequently, the change gear 12 is raised or descended, and resulting in changing a motor power transmission route from the first transmission system 8A over to the second transmission system 8B or vice.

Furthermore, the seesaw arm 20 is operated by a slide cam to be explained, and the slide arm 21 is operated by the driven body 6. In this first embodiment, the cam wheel 19 is rotated clockwise and pushes the change gear 12 upward when the driven body 6 pushes one end of the slide arm 21. Consequently, the motor power transmission route linking to the reversible motor 7 is changed from the first transmission system 8A over to the second transmission system 8B.

FIGS. 2(*a*) to 2(*d*) are exemplary drawings for explaining a process of changing the motor power transmission route. In FIGS. 2(*a*) to 2(*d*), hatched areas show the motor power transmission route. As shown in these drawings, the driven body 6 enables to move out of the movable range L of the pickup unit 2 to the left. FIG. 2(*a*) shows a pose status of the pickup unit 2 that is stopped at an initial position, which is one end of the movable range L. In FIG. 2(*b*), the driven body 6 is moved independently to the left out of the movable range L while the pickup unit 2 is in the pose status and pushes the slide arm 21 to the left. Consequently, the cam wheel 19 is initiated to rotate clockwise. As shown in FIGS. 2(*c*) and 2(*d*), rotating the cam wheel 19 conducts the motor power transmission route to change from the first transmission system 8A over to the second transmission system 8B.

Figure 3:
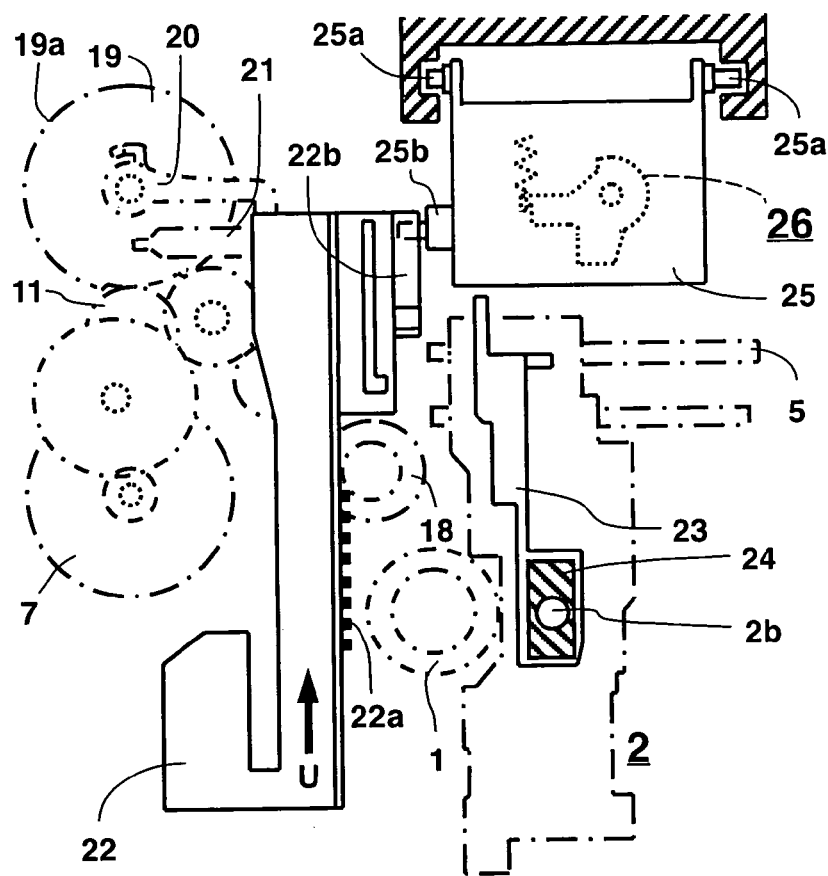
FIG. 3 is a plan view, partially in cross section, of the disc drive apparatus shown in FIG. 1 for explaining a disc carrying mechanism, which is disposed over the disc drive apparatus shown in FIG. 1.

FIG. 3 is a plan view, partially in cross section, of the disc drive apparatus shown in FIG. 1 for explaining a disc carrying mechanism, which is disposed over the disc drive apparatus shown in FIG. 1. In FIG. 3, reference signs 22, 23, 24, 25 and 26 denote a slide cam as mentioned above, a pitching cam, a magnetic head, a head lifter, and a locking body respectively. As shown in FIG. 3, the slide cam 22 is disposed over the gear transmission system 8. The slide cam 22 is provided with a gear section 22a, which is engaged with a smaller diameter section of the eighth gear 18 constituting the second transmission system 8B, and a plate cam section 22b, and enables to move upward in an arrow U direction.

Further, the slide cam 22 is linked to a disc holder not shown and constitutes the disc carrying mechanism for loading or unloading a disc together with the disc holder. It is possible to replace the disc carrying mechanism with a feed roller. However, in this first embodiment, a rack, which engages with the eighth gear 18, is formed on a disc holder for containing a disc such as a MD disc. When the disc holder containing a disc is loaded into the disc drive apparatus of the present invention, the disc holder is carried in the disc drive apparatus and pushes the slide cam 22 when the disc holder is carried to a predetermined position inside the disc drive apparatus, and then the gear section 22a of the slide cam 22 engages with the eighth gear 18. Consequently, both the disc holder and the slide cam 22 are kept advancing inside the disc drive apparatus more, and resulting in mounting a center portion of the disc on the turntable 1.

Furthermore, the slide cam 22 pushes one end of the seesaw arm 20 immediately before the disc is mounted on the turntable 1. The cam wheel 19 begins to rotate counterclockwise when the slide cam 22 pushes one end of the seesaw arm 20, and resulting in changing the motor power transmission route from the second transmission system 8B over to the first transmission system 8A.

As it is apparent from FIG. 3, the pitching arm 23, which enables to swing perpendicularly with respect to a top surface of the pickup unit 2, is provided on the pickup unit 2. The magnetic head 24 is mounted on a tip portion of the pitching arm 23 so as to confront with the objective lens 2b. The head lifter 25 pushes one end of the pitching arm 23 so as to raise the magnetic head 24. The head lifter 25 is provided with two pivots 25a on both sides and installed on a chassis of the disc drive apparatus so as to swing freely with centering the pivots 25a.

Further, a lock pin 25b, which is pressed down by the slide cam 22, is provided on a side surface of the head lifter 25.

Furthermore, the locking body 26 for locking the head lifter 25 is provided underneath the head lifter 25. Consequently, a head elevating mechanism, which conducts elevating operation of the magnetic head 24, is constituted.

Figure 4:
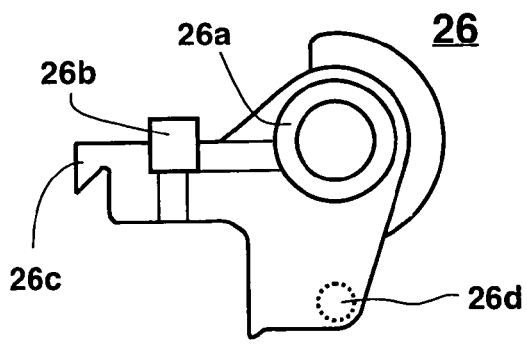
FIG. 4 is a plan view of a locking body shown in FIG. 3.

FIG. 4 is a plan view of the locking body 26 shown in FIG. 3. As shown in FIG. 4, the locking body 26 is formed with a circular hub 26a, a locking claw 26b, a hook 26c and a release pin 26d. The locking claw 26b is provided in a separated area away from the circular hub 26a for locking the head lifter 25. The hook 26c is provided for hooking a spring, which conducts the locking claw 26b in a locking direction of the head. lifter 25 to activate, thereon. The release pin 26d is provided for releasing the head lifer 25 from being locked by the locking claw 26 b.

Figure 5:
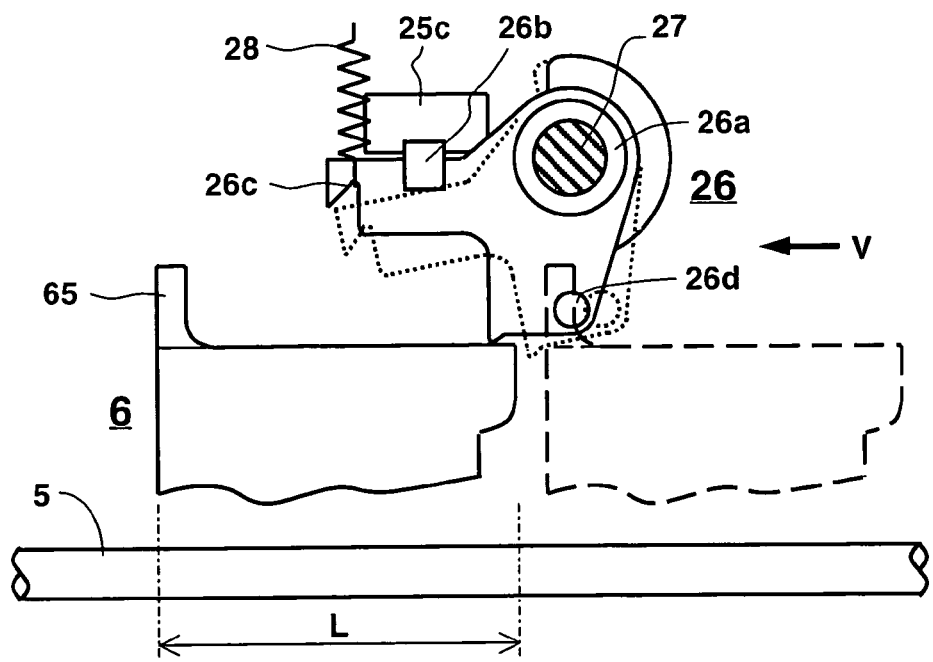
FIG. 5 is a plan view of the locking body and its neighboring area for explaining a status of a head lifter that is released from a locking status being locked by the locking body.

FIG. 5 is a plan view of the locking body 26 and its neighboring area for explaining a status of the head lifter 25 that is released from a locking status being locked by the locking body 26. As shown in FIG. 5, the locking body 26 is installed rotatably around a pin 27, which is formed on the chassis of the disc drive apparatus, adjacent to a moving path of the driven body 6 by inserting the pin 27 into the circular hub 26a. The locking body 26 is rotated clockwise around the pin 27 by tension of a spring 28 hooked on the hook 26c, and then the locking claw 26b is interlocked with an interlocking section 25c of the head lifter 25.

Further, the driven body 6 contacts with or approaches to a side surface of the locking body 26 within the movable range L of the pickup unit 2, and resulting in regulating the locking body 26 to be rotated counterclockwise around the pin 27 in a direction to release the head lifter 25 from being locked by the locking claw 26b. Consequently, the projection 65 of the driven body 6 pushes the release pin 26d of the locking body 26, and resulting in rotating the locking body 26 counterclockwise as shown by doted lines so as to unlock the head lifter 25 when the driven body 6 moves to the outside of the right end of the movable range L of the pickup unit 2, wherein the right end position of the movable range L is equivalent to a terminal position of a disc in an outer circumference area.

Figure 6:
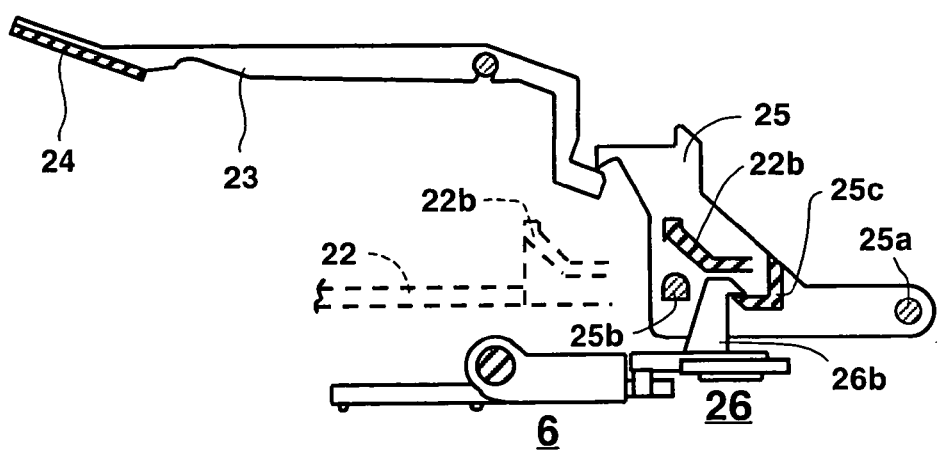
FIG. 6 is a side view of the head elevating mechanism that is viewed from an arrow V direction shown in FIG. 5 and rotated clockwise by 90 degrees showing a status of a magnetic head that is retained at an upper limit position.

FIG. 6 is a side view of the head lifter 25 that is in a status of being locked by the locking claw 26b of the locking body 26. In this locked status, as shown in FIG. 6, one tip portion of the pitching arm 23 is pushed down by a tip portion of the head lifter 25, and resulting in maintaining the magnetic head 24 mounted on the other tip portion of the pitching arm 23 at an upper limit position.

Figure 7:
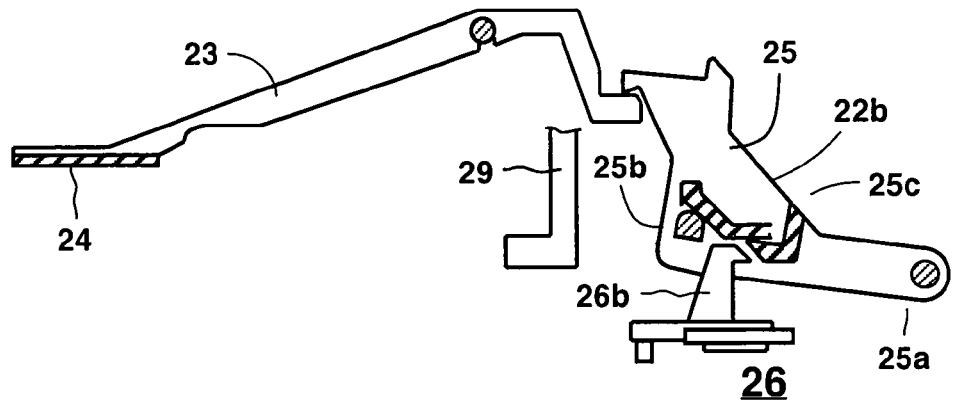
FIG. 7 is another side view of the head elevating mechanism, wherein the magnetic head is in a descended position.

FIG. 7 is another side view of the head lifter 25, wherein the head lifter 25 is released from the locked status of being locked by the locking claw 26b of the locking body 26. In FIG. 7, a reference sign 29 denotes a boom in L-shape. In this unlocked status, as shown in FIG. 7, the magnetic head 24 descends toward a disc, and resulting in enabling to record information in the disc. In this connection, the pitching arm 23 is pulled by a spring not shown in a direction to descend the magnetic head 24. Consequently, when the head lifter 25 is released from the locking claw 26b of the locking body 26, the tip portion of the head lifter 25 is pushed up by the other tip portion of the pitching arm 23.

Further, when the driven body 6 is brought back within the movable range L of the pickup unit 2, the locking claw 26b of the locking body 26 intrudes under the interlocking section 25c of the head lifter 25, and resulting in regulating the head lifter 25 from being rotated counterclockwise with centering the pivot 25a. Consequently, the one tip portion of the pitching arm 23 is never pushed down by the head lifter 25 when recording information in a disc, and resulting in preventing the magnetic head 24 from being lifted from the disc accidentally.

Furthermore, as shown in FIGS. 6 and 7, the slide cam 22 is formed with the plate cam section 22b, which locks the head lifter 25 at a lower limit position. The plate cam section 22b of the slide cam 22 is utilized for re-locking the head lifter 25 by the locking body 26. In other words, the head lifter 25 is re-locked by the locking body 26 after recording information in a disc, and then the magnetic head 24 is maintained at the upper limit position. In this connection, the head lifter 25 is rotated counterclockwise with centering the pivot 25a, and the interlocking section 25c of the head lifter 25 is essential to be descended down to a locking position of being locked by the locking claw 26b of the locking body 26. In a case of re-locking the head lifter 25 by the locking body 26, the driven body 6 is moved to the outside of the left end position of the movable range L of the pickup unit 2 in FIG. 1, wherein the left end position of the movable range L is equivalent to an initial position of a disc in an inner circumference area. Consequently, as mentioned above, the motor power transmission route is changed over to the second transmission system 8B and the slide cam 22 is moved forward to the left as shown by a dotted line in FIG. 6, and then the lock pin 25b of the head lifter 25 is pushed down by the plate cam section 22b of the slide cam 22.

When the lock pin 25b is pushed down by the plate cam section 22b, the driven body 6 is allocated in an area departing from the left side of the locking body 26, that is, the driven body 6 is allocated as illustrated by a solid line in FIG. 5, and the locking body 26 is allowed to swing in a direction to be released. Therefore, a slant section on a tip portion of the locking claw 26b is pushed by the interlocking section 25c when the head lifter 25 is rotated counterclockwise with centering the pivot 25a by the slide cam 22, and the locking body 26 is rotated in the direction to be released.

Further, the locking body 26 is pulled back in a direction to be locked by tension of the spring 28 when the interlocking section 25c reaches a terminating position of descending. Consequently, the locking claw 26b of the locking body 26 interlocks with the locking section 25c, and then re-locking of the head lifter 25 is completed.

Figure 8:
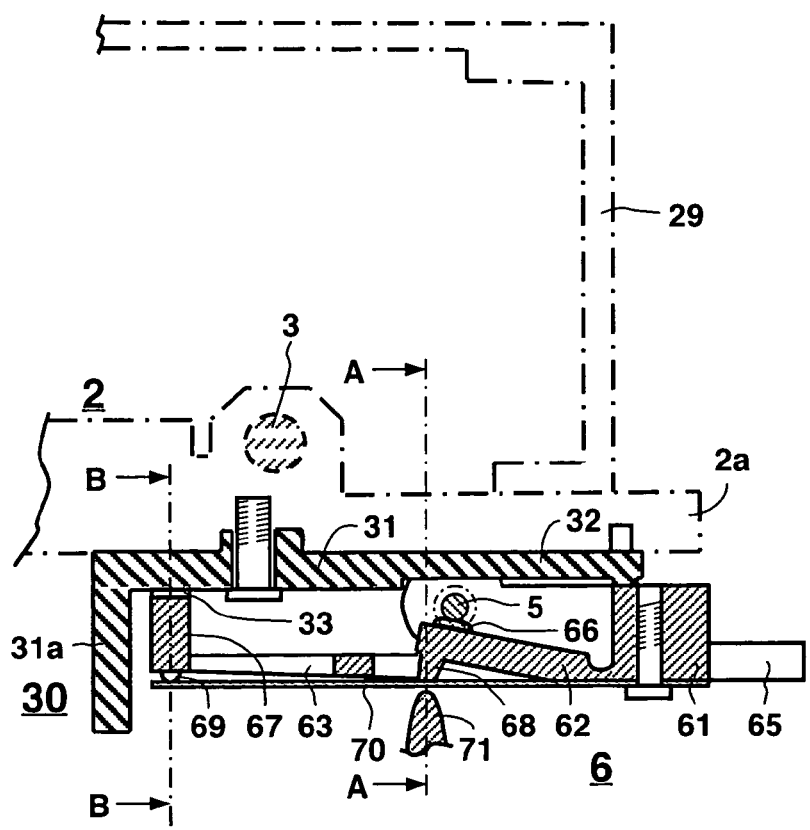
FIG. 8 is a cross sectional view of a pickup transport mechanism exhibiting one end of the pickup unit.

FIG. 8 is a cross sectional view of the pickup transport mechanism constituted by the pickup unit 2, driven body 6 and a fixing plate 30.

Figure 9:
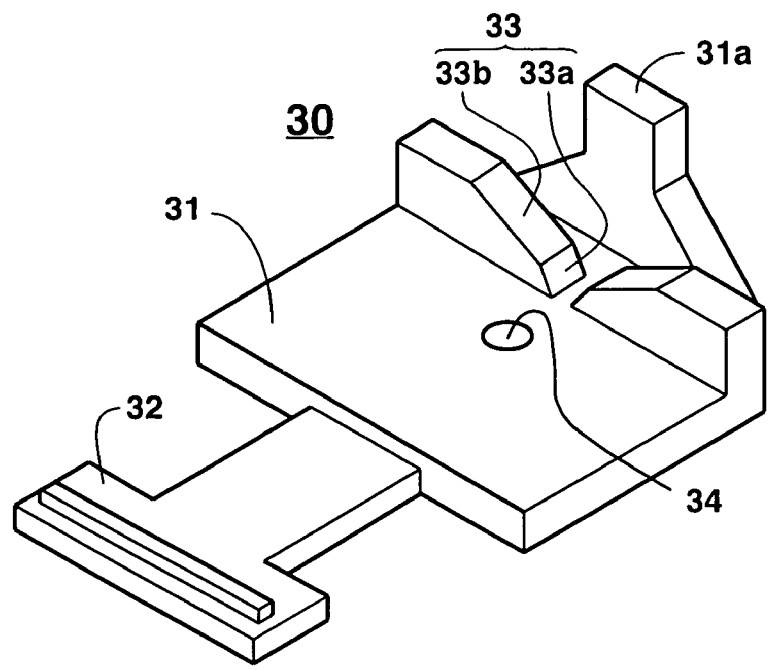
FIG. 9 is a perspective view of a fixing plate shown in FIG. 8, wherein the fixing plate is formed with a recessed section.

FIG. 9 is a perspective view of the fixing plate 30 shown in FIG. 8, wherein the fixing plate 30 is formed with a recessed potion 33.

Figure 10:
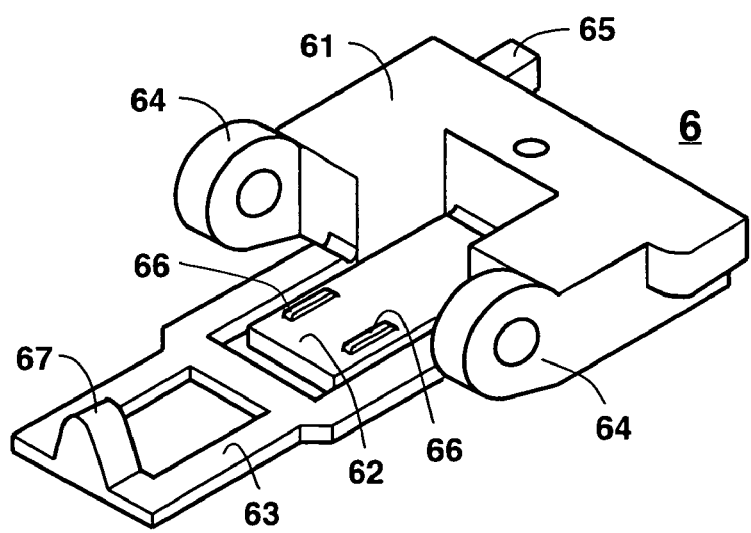
FIG. 10 is a perspective view of a driven body shown in FIG. 1.

FIG. 10 is a perspective view of the driven body 6.

Figure 11:
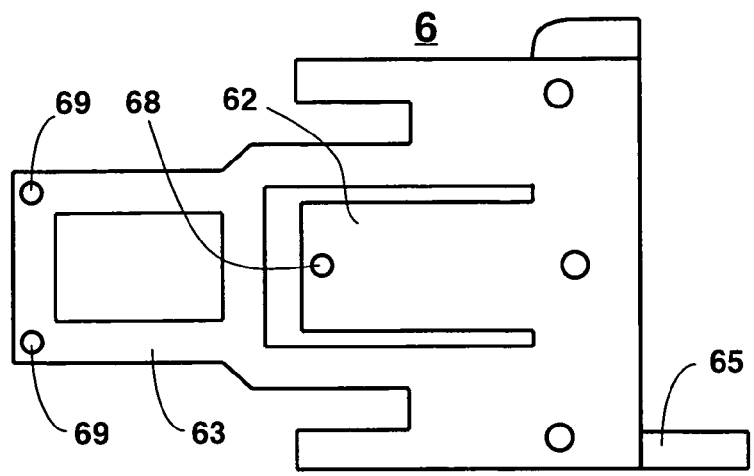
FIG. 11 is a bottom view of the driven body shown in FIG. 10.

FIG. 11 is a bottom view of the driven body 6 shown in FIG. 10.

Figure 12:
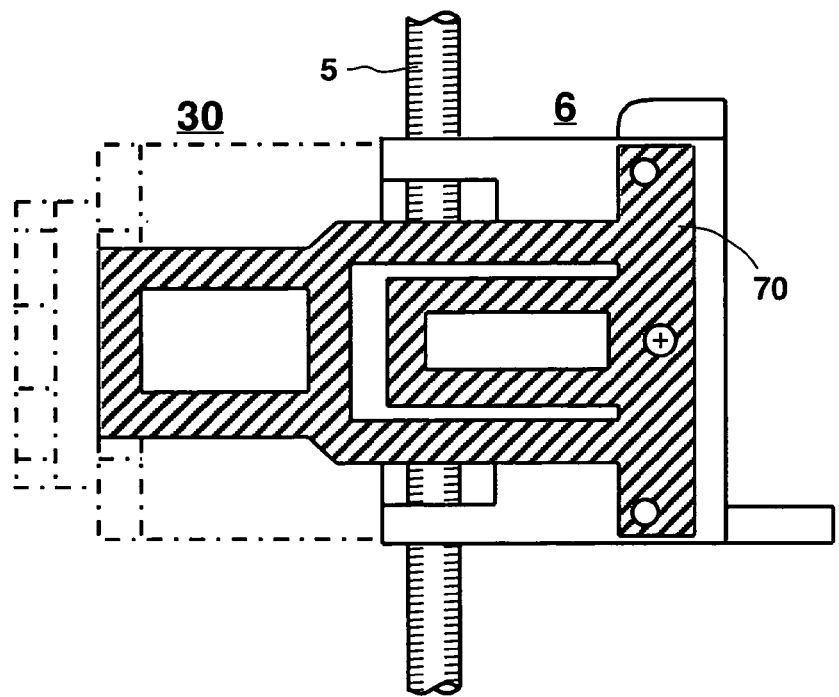
FIG. 12 is a bottom view of the driven body shown in FIG. 11 being installed with a screw shaft shown in FIG. 1 by means of an elastic member.

FIG. 12 is a bottom view of the driven body 6 installed with the screw shaft 5 by means of an elastic member 70.

Figure 13:
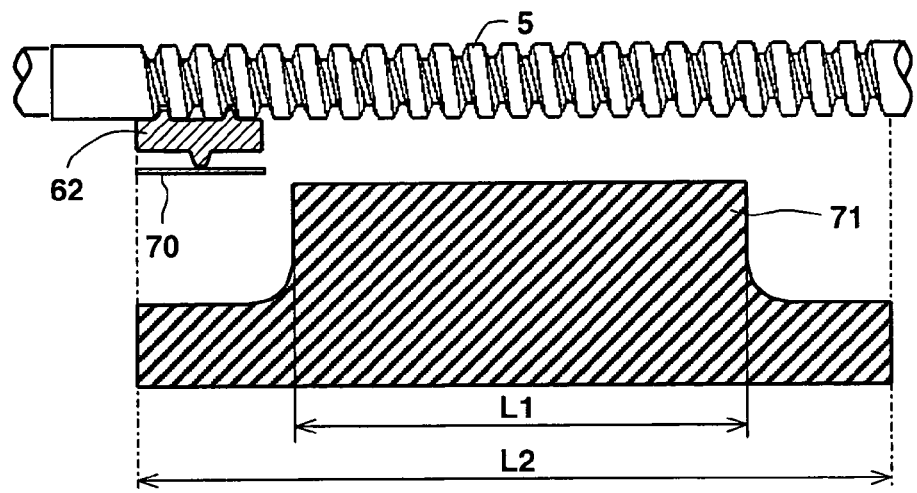
FIG. 13 is a cross sectional view taken along line A—A of FIG. 8.

FIG. 13 is a cross sectional view of the pickup transport mechanism taken along line A—A of FIG. 8.

Figure 14:
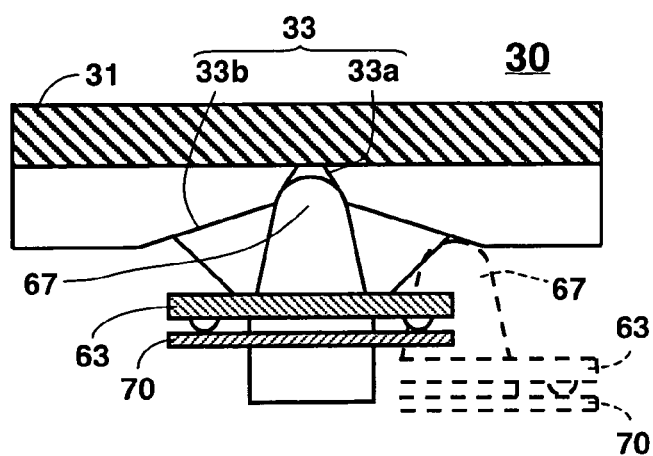
FIG. 14 a cross sectional view taken along line B—B of FIG. 8.

FIG. 14 is a cross sectional view of the pickup transport mechanism taken along line B—B of FIG. 8.

In FIG. 8, the boom 29 in L-shape is fixed on the carriage 2a of the pickup unit 2 so as to sustain the pitching arm 23.

As shown in FIG. 8, the pickup unit 2 is provided with a fixing plate 30 that is screwed on a bottom of the carriage 2a of the pickup unit 2. As shown in FIG. 9, the fixing plate 30 is composed of a base section 31, an arm section 32, a recessed section 33 and a mounting hole 34. The base section 31 is provided with a raised portion 31a. The arm section 32 extends from the base section 31. The recessed section 33 is further composed of a steep slope section 33a and a gradual slope section 33b, and engages with the driven body 6. The mounting hole 34 is provided for screwing the fixing plate 30 on the carriage 2a. It should be understood that the fixing plate 30 enables to be formed together with the carriage 2a in one piece instead of forming the fixing plate 30 independently.

Further, as shown in FIGS. 8 and 10, the driven body 6 is composed of a main body 61, a rack portion 62, an arm portion 63, a pair of bracket 64, the projection 65, a pair of tooth portion 66, and a protrusion 67. The rack portion 62 is linked to the main body 61 and enables to swing freely and provided inside the arm portion 63. The pair of bracket 64 is provided for passing the screw shaft 5 through. The projection 65 is formed for pushing the above-mentioned slide arm 21 and the release pin 26d of the locking body 26. The tooth portion 66 is formed on the rack portion 62 so as to be engaged with a screw groove of the screw shaft 5. The protrusion 67 is formed on a tip portion of the arm portion 63 so as to be engaged with the recessed section 33 of the fixing plate 30.

Furthermore, as shown in FIG. 11, a boss 68 is provided in a tip area of the rack portion 62 on the bottom so as to project, and two bosses 69 are also provided in a tip area of the arm portion 63 on the bottom so as to project.

More, as shown in FIG. 12, the driven body 6 is further mounted with the elastic member 70 (hereinafter referred to as leaf spring 70) on the bottom.

As shown in FIG. 8, the leaf spring 70 is provided for pushing the rack portion 62 against the outer circumferential surface of the screw shaft 5 by means of the boss 68. Therefore, the tooth portion 66 of the rack portion 62 is maintained in a status of engaging with the screw groove of the screw shaft 5, and then the driven body 6 enables to be steadily moved in the longitudinal direction of the screw shaft 5 when the screw shaft 5 is driven to rotate.

Further, the arm section 32 of the fixing plate 30 contacts with the main body 61 of the driven body 6 to be able to slide and regulates the driven body 6 to be rotated counterclockwise in FIG. 8. However, it should be understood that the main body 61 of the driven body 6 is applicable to be contacted with the bottom of the carriage 2a of the pickup unit 2 while the arm section 32 is omitted.

As mentioned above, the rack portion 62 enables to maintain a state of engaging with the screw shaft 5 by effect of the leaf spring 70. However, in a case that pressure of the leaf spring 70 is excessive, burden on the driven body 6 increases, and resulting in interfering in smooth operation of the driven body 6. On the contrary, in a case that pressure of the leaf spring 62 is made lower so as to release such a reaction, the rack portion 62 departs from the screw shaft 5, and resulting in generating defective operation of the driven body 6.

Accordingly, in the first embodiment of the present invention, pressure of the leaf spring 70 acting on the rack portion 62 is set to be lower as low as normal operation of the driven body 6 is not obstructed. As shown in FIG. 8, a rib 71 is provided in a neighboring area of the screw shaft 5 so as to prevent the leaf spring 70 from being elastically deformed in a direction opposite to the pressing direction of the leaf spring 70 toward the rack portion 62. As shown in FIG. 13, the rib 71 is provided with being extended along the longitudinal direction of the screw shaft 5. In other words, the rib 71 is provided along the moving path of the driven body 6 and confronts with the rack portion 62 with sandwiching the leaf spring 70 between them. According to this configuration, the rack portion 62 is prevented from being separated from the screw shaft 5 by possible shock and vibration propagating externally although pressure of the leaf spring 70 acting on the rack portion 62 is low.

As shown in FIG. 13, an effective length L1 of the rib 71 is set to be shorter than a movable range L2 of the driven body 6 in particular. When the driven body 6 reaches a limiting end of the movable range L2 after activating both of the transmission route changing mechanism and the head elevating mechanism, the leaf spring 70 and the rack portion 62 exceeds an end of the effective length L1 of the rib 71 and the rack portion 62 is allowed to be separated from the screw shaft 5. In this connection, the rack portion 62 is released from the screw shaft 5 at both end sections of the screw shaft 5 and the pickup transport mechanism enables to be secured from being damaged by overloading caused by the screw shaft 5 rotating even in a case that the screw shaft 5 delays in being stopped rotating when a problem occurs in a mechanical system or an electrical system.

Further, as shown in FIG. 8, the leaf spring 70 functions such as maintaining a status of engaging the protrusion 67 of the driven body 6 with the recessed section 33 of the fixing plate 30 by pushing not only the rack portion 62 but also the arm portion 63 toward the pickup unit 2 side. As shown in FIG. 14, a tip portion of the protrusion 67 is rounded and the recessed section 33 is formed in a two-stage construction such that the steep slope section 33a is provided for inserting the protrusion 67 therein and the gradual slope section 33b, which extends out in an unfolded fan shape from edge portions of the steep slope section 33a.

Furthermore, the tip portion of the protrusion 67 fits in the steep slope section 33a within the movable range L of the pickup unit 2. Consequently, the pickup unit 2 moves together with the driven body 6 to a transporting direction of the pickup unit 2, wherein the tip portion of the protrusion 67 keeps fitting in the steep slope section 33a when the driven body 6 is moved to the transporting direction of the pickup unit 2 by rotating the screw shaft 5 clockwise or counterclockwise.

More, when the pickup unit 2 reaches either the initial position or the terminal position, the driven body 6 enables to be moved independently outside the movable range L of the pickup unit 2 while the pickup unit 2 is left at either the initial position or the terminal position as mentioned above. In other words, if the screw shaft 5 is kept rotating even after the pickup unit 2 reaches at either the initial position or the terminal position, the tip portion of the protrusion 67 evacuates from the steep slope section 33a of the recessed section 33 as shown by a doted line in FIG. 14, and then the driven body 6 moves outside the movable range L of the pickup unit 2 while the tip of the protrusion 67 slides along the gradual slope section 33b of the recessed section 33. In this connection, the protrusion 67 keeps engaging with the gradual slope section 33b although the driven body 6 reaches its limit position of moving.

As mentioned above, the recessed section 33 is formed in the two-stage construction having the steep slope section 33a and the gradual slope section 33b, so that the driven body 6 of which the tip portion of the protrusion 67 fits in the steep slope section 33a of the recessed section 33 moves together with the pickup unit 2 within the movable range L of the pickup unit 2.

On the other hand, outside the movable range L of the pickup unit 2, the driven body 6 enables to be moved independently of the pickup unit 2 low in burden and smoothly while the tip portion of the protrusion 67 slides along the gradual slope section 33b.

Further, when the driven body 6 is brought back within the movable range L of the pickup unit 2, the pickup unit 2 enables to be kept in a stop mode as long as the tip portion of the protrusion 67 slides along the gradual slope section 33 and fits in the steep slope section 33a of the recessed section 33.

In this first embodiment, the recessed section 33 and the protrusion 67 is formed on the fixing plate 30 and the driven body 6 respectively. However, it should be understood that the recessed section 33 and the protrusion 67 enables to be formed on the driven body 6 and the fixing plate 30 respectively.

Operations of the disc drive apparatus of the present invention constituted as mentioned above are detailed next.

A. When Loading a Disc:

The slide cam 22 that constitutes the disc carrying mechanism is in a front-end position in FIG. 3, and the second transmission system 8B is linked to the reversible motor 7. In this configuration, when a disc such as a MD disc is inserted into a disc holder not shown and loaded into the disc drive apparatus, a sensor not shown detects the disc holder and the reversible motor 7 rotates clockwise in a normal rotative direction, and then the disc holder is brought in the disc drive apparatus. The disc holder pushes the slide cam 22 when the disc holder is brought in a predetermined position, and then the gear section 22a of the slide cam 22 engages with the eighth gear 18, and resulting in starting to bring in the slide cam 22 in the arrow U direction. The slide cam 22 pushes the tip of the seesaw arm 20 immediately before the center of the disc is placed on the turntable 1, and the gear section 19a of the cam wheel 19 engages with the third gear 11, and resulting in conducting to descend the change gear 12 by the rotation of the third gear 11. Consequently, the motor power transmission route is changed over to the first transmission system 8A.

B. When Reproducing:

The plate cam section 22b of the slide cam 22 is released from the lock pin 25b of the head lifter 25 when the motor power transmission route is changed over to the first transmission system 8A. On the other hand, the head lifter 25 is kept in a locked status being locked by the locking body 26 and the magnetic head 24 is maintained in the upper limit position as shown in FIG. 6. During these statuses, driving to rotate the reversible motor 7 clockwise or counterclockwise enables to reproduce recorded information in a disc while transporting the pickup unit 2 in a radial direction of the disc.

C. When Recording:

On the contrary, in a case of recording information in a disc, the screw shaft 5 is kept rotating even after the pickup unit 2 is transported to a terminal position in an outer circumferential area of a disc. Then, as shown in FIG. 5, the projection 65 of the driven body 6 pushes the release pin 26d of the locking body 26 to the right while the locking body 6 moves independently to the outside of the terminal position of the pickup unit 2. Pushing the release pin 26d to the right makes the locking body 26 rotate counterclockwise with centering the pin 27 as shown by a dotted line in FIG. 5, and resulting in releasing the locking claw 26b from the interlocking section 25c of the head lifter 25. Consequently, as shown in FIG. 7, the magnetic head 24 descends down to the lower limit position, and resulting in enabling to record information in a disc.

Further, in a case that the pickup unit 2 is transported in a radial direction of a disc by bringing the locking body 6 back within the movable range L of the pickup unit 2 so as to record information in the disc, the locking claw 26b of the locking body 26 intrudes under the interlocking section 25c, and resulting in regulating the head lifter 25 from being rotated counterclockwise with centering the pivot 25a. Consequently, recording the information in the disc is securely conducted while the magnetic head 24 is kept contacting with the disc.

D. When Unloading a Disc:

In a case of unloading a disc, the screw shaft 5 is kept rotating even after the pickup unit 2 is transported to the initial position in an inner circumferential area of the disc. Then, the projection 65 of the driven body 6 pushes the right end of the slide arm 21 while the driven body 6 moves independently of the pickup unit 2 to the outside of the initial position of the pickup unit 2. Pushing the slide arm 21 makes the gear section 19a of the cam wheel 19 engaging with the third gear 11, and the change gear 12 is raised by the rotation of the cam wheel 19, and resulting in changing the motor power transmission route over to the second transmission system 8B. The slide cam 22 of which gear section 22a is engaged with the eighth gear 18 is advanced and pushes a disc holder not shown when the slide cam 22 reaches the predetermined position. Consequently, the disc contained in the disc holder is ejected from the disc holder.

Further, when unloading a disc, moving the slide cam 22 forward conducts the plate cam section 22b of the slide cam 22 to push the lock pin 25b of the head lifter 25 downward, so that the head lifter 25 is locked by the slide cam 22 and the locking body 26 doubly. In a case of shifting a recording status over to a reproducing status, the rotative direction of the reversible motor 7 is changed from the reverse direction to the normal direction when the plate cam section 22b of the slide cam 22 pushes the lock pin 25b of the head lifter 25 downward, and then the slide cam 22 is pulled in as far as it's rear end without moving the disc holder not shown immediately after the head lifter 25 is re-locked by the locking body 26.

While the invention has been described above with reference to a specific embodiment thereof, it is apparent that many changes, modifications and variations in the arrangement of equipment and devices can be made without departing from the invention concept disclosed herein. For example, the motor power transmission route enables to be realized by using a planet gear in stead of using the cam mechanism mentioned in the first embodiment above.

Further, the disc drive apparatus of the first embodiment of the present invention is constituted such that the magnetic head 24 is descended by moving the driven body 6 to the outside of the movable range L of the pickup unit 2. However, a motor for rotating a disc, which is loaded on the turntable 1, enables to be used as a head elevating mechanism. With referring to FIGS. 15 and 16, another disc drive apparatus composed of such a head elevating mechanism is explained next.

[Second Embodiment]

A disc drive apparatus according to a second embodiment is similar to that of the first embodiment except for a head elevating mechanism and its peripheral areas, so that the same components are denoted by the same reference signs and details of their functions and operations are omitted.

Figure 15:
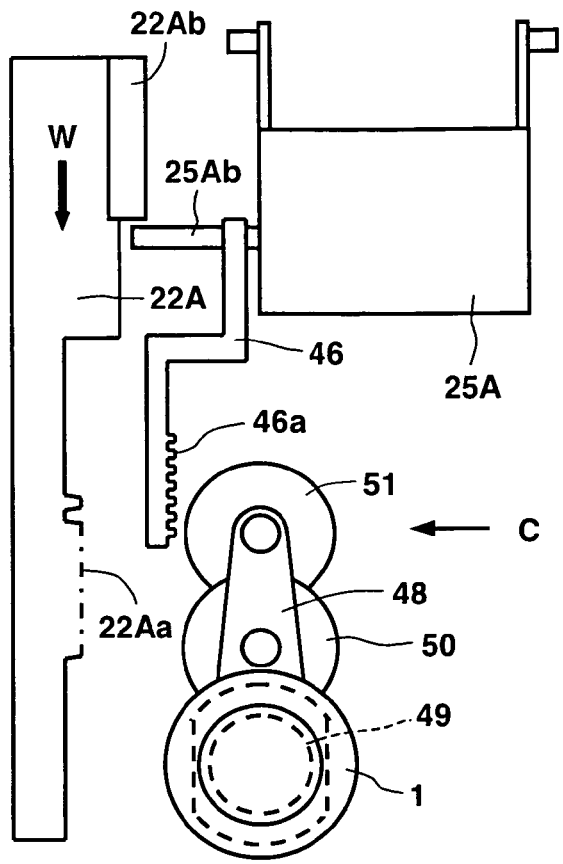
FIG. 15 is a plan view of a head elevating mechanism equipped with another slide cam as a variation of the slide cam shown in FIG. 3 according to a second embodiment of the present invention.

FIG. 15 is a plan view of a head elevating mechanism equipped with another slide cam according to a second embodiment of the present invention.

Figure 16:
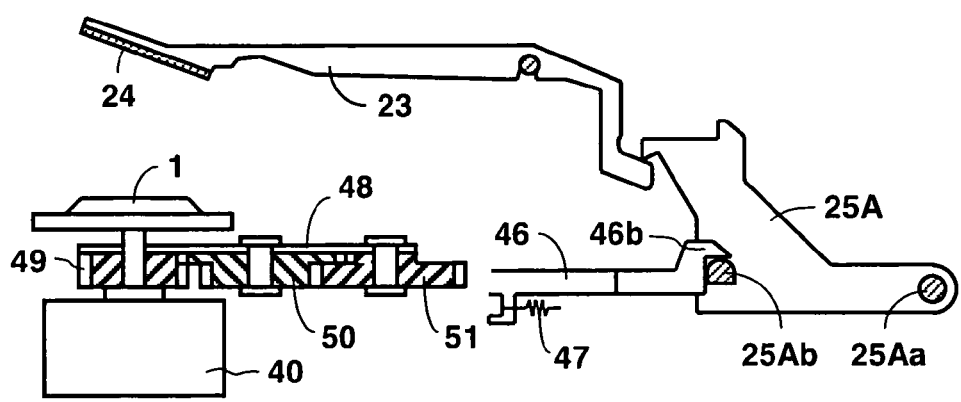
FIG. 16 is a side view of the head elevating mechanism shown in FIG. 15 that is viewed from an arrow C direction shown in FIG. 15.

FIG. 16 is a side view of the head elevating mechanism shown in FIG. 15 that is viewed from an arrow C direction shown in FIG. 15.

In FIG. 15, reference signs 22A, 25A, and 46 denote a slide cam, a head lifter, and a locking body respectively in accordance with the second embodiment of the present invention. Reference signs 48, 49, 50, and 51 denote a circling arm, a sun gear, an idle gear, and a planet gear respectively. The slide cam 22A is composed of a gear section 22Aa and a plate cam section 22Ab. The head lifter 25A is provided with a lock pin 25Ab. The locking body 46 is substitute for the locking body 26 of the first embodiment. The locking body 46 is in an arm shape and provided with a gear section 46a, which is formed on one end of the locking body 46 so as to confront to the planet gear 51. In FIG. 16, reference signs 25Aa and 46b denote a pivot of the head lifter 25A and a locking claw of the locking body 46 respectively. The locking claw 46b is formed on another end of the locking body 46 in opposite to the end formed with the gear section 46a. A reference sign 40 is a stepping motor for rotating a disc, which is rotatable reversely, and the turntable 1 is mounted on a driving shaft of the stepping motor 40 as commonly known.

Further, the locking body 46 is installed movably between the stepping motor 40 and the head lifter 25A and drawn to the head lifter 25A side by a tension of a spring 47 attached thereon.

Furthermore, the other end of the locking body 46 pushes the lock pin 25Ab of the head lifter 25A, and resulting in locking the head lifter 25A. Then, the magnetic head 24 is maintained at the upper limit position as the same manner as the first embodiment.

Particularly, in this second embodiment, the circling arm 48 is installed in the driving shaft of the stepping motor 40. The circling arm 48 extends along a direction perpendicular to the driving shaft and is constituted as a releasing mechanism for releasing the head lifter 25A from being locked by the locking body 46. The releasing mechanism is composed of the sun gear 49 mounted on the driving shaft of the stepping motor 40, the idle gear 50 engaging with the sun gear 49 and the planet gear 51 engaging with the idle gear 50. These idle and planet gears 50 and 51 are mounted on the circling arm 48. The gear section 46a of the locking body 46 engages with the planet gear 51 when the stepping motor 40 rotates reversely, that is, rotates in an opposite direction to the direction while reproducing a disc, and resulting in releasing the head lifter 25A from being locked by the locking claw 46b. In other words, the circling arm 48 circles toward the locking body 46 when the stepping motor 40 rotates reversely while the planet gear 51 rotates to the same direction as the rotative direction of the stepping motor 40. The locking body 46 is drawn to the stepping motor 40 side when the gear section 46a of the locking body 46 engages with the planet gear 51, and then the locking claw 46b is released from the lock pin 25Ab of the head lifter 25A.

Further, in a case that the head lifter 25A is released from being locked by the locking body 46, the magnetic head 24 descends, and resulting in enabling to record information in a disc as mentioned above. While recording information in a disc, the locking claw 46b of the locking body 46 intrudes under the lock pin 25Ab, and resulting in regulating the head lifter 25A from being rotated counterclockwise with centering a pivot 25Aa.

Furthermore, when raising the magnetic head 24, advancing the slide cam 22A to an arrow direction W in FIG. 15 makes the head lifter 25A swing downward as the same manner as that of the first embodiment, and resulting in enabling to re-lock the head lifter 25A by the locking body 46.

While the invention has been described above with reference to specific embodiment thereof, it is apparent that many changes, modifications and variations in the arrangement of equipment and devices can be made without departing from the invention concept disclosed herein. For example, it is acceptable for the present invention that by connecting one end of the circling arm 48 to the driving shaft of the stepping motor 40 through a one way clutch while all of the sun gear 49, the idle gear 50 and the planet gear 51 are omitted, and further by replacing the locking body 46 with a yawing arm enabling to swing horizontally, pushing one end of the yawing arm by the circling arm 48 conducts the head lifter 25A to be released from being locked by the yawing arm while the stepping motor 40 rotates reversely.

Further, the above-mentioned disc drive apparatus according to the first and second embodiments of the present invention enables to be applied for not only a magneto-optical recording and reproducing apparatus such as an MD player but also an optical recording and reproducing apparatus for an optical disc such as a DVD-RAM disc by omitting a magnetic head and its elevating mechanism.

According to a disc drive apparatus of the present invention, only one driving source or motor enables to carry a disc and transport a pickup unit, so that the apparatus is made to be small in size and low in cost. Particularly, a pickup transport mechanism is provided with a driven body, which moves independently out of a movable range of the pickup unit. Moving the driven body independently out of the movable range of the pickup unit conducts to change a transport operation of the pickup unit to a disc carrying operation, and vice versa. Consequently, the apparatus enables to be applied for recording and reproducing not only a CD disc and a DVD disc but also a disc contained in a cartridge such as an MD disc. In this connection, changing the transporting operation of the pickup unit to the disc carrying operation and vice versa is securely conducted without interfering the pickup unit with the cartridge.

Further, moving the driven body out of the movable range of the pickup unit makes a magnetic head descend, so that three individual operations are conducted by only one motor. Consequently, a less expensive apparatus enables to be provided.

Furthermore, the magnetic head is prevented from accidental fall caused by external vibration.

More, the magnetic head is descended by using another motor for rotating a disc, so that the apparatus enables to be small in size and low in cost without installing an exclusive motor for elevating the magnetic head.

Moreover, the driven body enables to be moved excellently as well as being prevented from damage caused by overloading, so that transporting the pickup unit is improved in accuracy.

In addition thereto, within the movable range of the pickup unit, the pickup unit and the driven body enables to be moved accurately by transmitting power of the driven body to the pickup unit without loss. Particularly, the driven body enables to be moved outside the movable range of the pickup unit smoothly and in low load.

It will be apparent to those skilled in the art that various modification and variations could be made in the magnetron sputtering apparatus in the present invention without departing from the scope or spirit of the invention.

What is claimed is:

1. A disc drive apparatus comprising:
   a disc carrying means for loading and unloading a disc;
   a turntable to be loaded with a disc carried in by the disc carrying means;
   a pickup unit to read out information recorded in the disc;
   a pickup transport means for transporting the pickup unit in a radial direction of the disc loaded on the turntable;
   a driving source;
   a first transmission system to transmit power of the driving source to the pickup transport means;
   a second transmission system to transmit the power of the driving source to the disc carrying means; and
   a transmission route changing means for changing a transmission route linking to the driving source from either one of the first and second transmission systems over to another transmission system,
   the pickup transport means further comprising:
   a motive body enabling to rotate reversibly by means of power transmitted through the first transmission system; and
   a driven body linking to the motive body and the pickup unit,
   wherein the driven body moves reciprocally and linearly in a transport direction of the pickup unit by means of reversible rotation of the motive body, and moves with being accompanied by the pickup unit within a movable range of the pickup unit and moves independently out of the movable range of the pickup unit, and
   wherein the transmission route changing means conducts to change the transmission route linked to the driving source from the first transmission system over to the second transmission system when the driven body is moved independently out of the movable range of the pickup unit while the pickup unit is stopped at one end of the movable range of the pickup unit.

2. The disc drive apparatus as claimed in claim 1, the disc drive apparatus further comprising:
   a magnetic head to record information provided above the pickup unit so as to be able to elevate; and
   a head elevating means for elevating the magnetic head, the head elevating means further comprising:
   a head lifter to raise the magnetic head; and
   a locking body to lock the head lifter,
   wherein the magnetic head is maintained at an upper limit position when the head lifter is locked by the locking body, and wherein the head lifter is released from being locked by the locking body when the driven body is moved out of the movable range of the pickup unit and the magnetic head descends toward the disc, and resulting in enabling to record information in the disc.

3. The disc drive apparatus as claimed in claim 2, wherein the locking body is provided rotatably and adjacently to a movable path of the driven body, and wherein the driven body contacts with or approaches to a side of the locking body within the movable range of the pickup unit, and resulting in regulating the locking body from rotating in a direction releasing the head lifter from being locked, and wherein the driven body pushes the locking body when moving out of the movable range of the pickup unit, and makes the locking body rotate in a direction releasing the head lifter from being locked.

4. The disc drive apparatus as claimed in claim 1, the disc drive apparatus further comprising:

a magnetic head to record information provided above the pickup unit so as to be able to elevate; and a head elevating means for elevating the magnetic head, the head elevating means further comprising:

a head lifter to raise the magnetic head;

a locking body to lock the head lifter;

a motor rotatable reversely to rotate the turntable; and a releasing means for releasing the head lifter from being locked by the locking body by rotating the motor in a direction opposite to a normal rotative direction while reproducing a disc, wherein the magnetic head is maintained at an upper limit position when the head lifter is locked by the locking body, and wherein the magnetic head descends toward the disc when the head lifter is released from being locked by the locking body by rotating the motor in the reverse direction, and resulting in enabling to record information in the disc.

5. The disc drive apparatus as claimed in claim 1, wherein the motive body to drive the pickup transport means is a screw shaft, and wherein the driven body engaging with the screw shaft is formed with a rack portion that is pushed against an outer circumferential surface of the screw shaft by means of an elastic member and provided with a rib adjacently to the screw shaft so as to regulate the elastic member from being deformed elastically in a reverse direction opposite to a pressing direction of the rack portion against the screw shaft, and wherein the elastic member and the rack portion departs from an end position of the rib when the driven body reaches a limiting position to move, and resulting in allowing the rack portion to depart from the screw shaft.

6. The disc drive apparatus as claimed in claim 1, wherein an engaging section between the pickup unit and the driven body is provided with a raised portion that is formed on either one of the pickup unit and the driven body and a recessed section that is formed on another one, and wherein the recessed section is formed in a two-stage construction such that a steep slope section is provided for inserting the raised portion therein and a gradual slope section, which extends out in an unfolded fan shape from edge portions of the steep slope section, and wherein a tip of the raised portion evacuates from the steep slope section when the driven body moves out of the movable range of the pickup unit and the tip of the raised portion contacts with the gradual slope section.

* * * * *